US012094354B2

(12) United States Patent
Songa et al.

(10) Patent No.: US 12,094,354 B2
(45) Date of Patent: Sep. 17, 2024

(54) SYSTEMS AND METHODS FOR MONITORING AND PROVIDING ALERTS FOR TAKEOFF RUNWAY INTERSECTIONS

(71) Applicant: HONEYWELL INTERNATIONAL INC., Charlotte, NC (US)

(72) Inventors: Anil Kumar Songa, Bangalore (IN); Kalaiarasu Velappan, Bangalore (IN); Dileep Thekkumkara, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 287 days.

(21) Appl. No.: 17/647,270

(22) Filed: Jan. 6, 2022

(65) Prior Publication Data

US 2023/0136572 A1 May 4, 2023

(30) Foreign Application Priority Data

Oct. 28, 2021 (IN) ............................ 202111049325

(51) Int. Cl.
*G08G 5/00* (2006.01)
*G08G 5/06* (2006.01)

(52) U.S. Cl.
CPC ........... *G08G 5/065* (2013.01); *G08G 5/0013* (2013.01); *G08G 5/0021* (2013.01); *G08G 5/0086* (2013.01); *G08G 5/0091* (2013.01)

(58) Field of Classification Search
CPC .... G08G 5/065; G08G 5/0013; G08G 5/0021; G08G 5/0086; G08G 5/0091; G08G 5/0065

(Continued)

(56) References Cited

U.S. PATENT DOCUMENTS

| | | | |
|---|---|---|---|
| 7,590,484 | B2 | 9/2009 | Gellert |
| 8,441,376 | B1 | 5/2013 | Tsai et al. |

(Continued)

FOREIGN PATENT DOCUMENTS

| | | | |
|---|---|---|---|
| CN | 111968409 | B | 6/2021 |
| EP | 3816972 | A1 | 5/2021 |

OTHER PUBLICATIONS

Federal Aviation Administration: "Pilot's Handbook of Aeronautical Knowledge—Chapter 11: Aircraft Performance' In: Pilot's Handbook of Aeronautical Knowledge—Chapter 11: Aircraft Performance". Published Jan. 1, 2016 US Department of Transportation, XP93032504, Retrieved from the Internet: URL: https://www.faa.gov/sites/faa.gov/files/regulations_policies/handbook_manuals/aviation/phak/13_phak_ch11.pdf>.

(Continued)

*Primary Examiner* — Ian Jen
*Assistant Examiner* — Hossam M Abd El Latif
(74) *Attorney, Agent, or Firm* — Lorenz & Kopf LLP

(57) ABSTRACT

A method in an aircraft for identifying valid runway intersections for takeoff is provided. The method comprises: estimating a runway length required for takeoff based on aircraft parameters; estimating, at each of a plurality of runway intersections, a corrected runway length at the runway intersection by applying an elevation correction, a temperature correction, and a gradient correction; determining, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for (Continued)

takeoff; and signaling an aircraft display device to display on a map depicting the takeoff runway each invalid runway intersection.

20 Claims, 5 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 9,117,370 | B1 | 8/2015 | Jensen et al. | |
| 9,646,501 | B2 | 5/2017 | Idupunur et al. | |
| 2004/0167685 | A1* | 8/2004 | Ryan | B64C 25/426 701/16 |
| 2008/0215198 | A1 | 9/2008 | Richards et al. | |
| 2008/0275642 | A1* | 11/2008 | Clark | G01C 23/00 701/457 |
| 2012/0209458 | A1 | 8/2012 | Sampath | |
| 2013/0231853 | A1 | 9/2013 | Feyereisen et al. | |
| 2013/0271300 | A1 | 10/2013 | Pepitone et al. | |
| 2014/0343764 | A1* | 11/2014 | Sacle | B64D 45/04 701/16 |
| 2015/0262493 | A1* | 9/2015 | Jensen | G08G 5/0021 701/3 |
| 2018/0061243 | A1* | 3/2018 | Shloosh | G08G 5/0043 |
| 2018/0107227 | A1* | 4/2018 | Sharma | B64D 45/04 |
| 2018/0308367 | A1* | 10/2018 | Zhang | B64U 20/30 |
| 2019/0056740 | A1 | 2/2019 | Westphal et al. | |
| 2019/0318639 | A1* | 10/2019 | Chartier | G08G 5/0026 |
| 2022/0051578 | A1* | 2/2022 | Kolesinski | B64D 45/00 |

OTHER PUBLICATIONS

Rastogi, Deepanshu, "Airport Runway Length: ESE & Gate CE / Gradeup, BYJU'S Exam Prep", downloaded from: https://byjusexamprep.com/AirportRailwayHarbourandPorts/AirportRailwayHarbourandPorts-i-82558360-ac8c-11e6-bf0d-8b7dbbd82825 on Sep. 28, 2021.

* cited by examiner

SYSTEMS AND METHODS FOR MONITORING AND PROVIDING ALERTS FOR TAKEOFF RUNWAY INTERSECTIONS

CROSS REFERENCE TO RELATED APPLICATION

The present application claims benefit of prior filed India Provisional Patent Application No. 202111049325, filed Oct. 28, 2021, which is hereby incorporated by reference herein in its entirety.

TECHNICAL FIELD

Embodiments of the subject matter described herein relate generally to aircraft systems. More particularly, embodiments of the subject matter relate to systems and methods for assisting with identifying valid runway intersections for takeoff at an aerodrome.

BACKGROUND

An aircraft may begin takeoff from a beginning point on a runway and use the full-length of the runway for takeoff. In some situations, an aircraft may begin takeoff from an intersection takeoff position on the runway and begin takeoff from the intersection takeoff position and only use part of the length of the runway for takeoff. An intersection takeoff is a takeoff that starts at a position different from the beginning of a runway. When an intersection takeoff is undertaken, some of the runway will not be available for the takeoff.

An aircraft may be cleared by an air traffic controller (ATC) to depart from a published intersection take off position upon request by a pilot, or when initiated by ATC upon acceptance by the pilot. Takeoff from an intersection take off position can be safe when certain conditions are met. For example, on high temperature days (e.g., about 47 degrees Celsius) a longer runway for takeoff is required since the air is thinner. Those conditions may include the time of day, visibility, specific intersection location, temperature, and others.

The choice between a full-length takeoff or an intersection take off is an aspect of the decision making process for the flight crew. While ATC may offer (or approve) an intersection takeoff it is the responsibility of the pilot in command to assess whether this is a safe option and, if not, to decline the ATC proposal. The potential benefits (e.g., flight efficiency) of an intersection takeoff needs to be balanced against the potential risks. This can add to pilot workload during this phase of operations.

Hence, it is desirable to provide a system and method for reducing the workload of a flight crew while preparing for takeoff. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system for identifying valid runway intersections for takeoff is provided. The flight deck system includes an aircraft display device in an aircraft and a controller. The controller is configured to: estimate a runway length required for takeoff based on aircraft parameters (e.g., aircraft type, aircraft weight, etc.); estimate, at each of a plurality of runway intersections, a corrected runway length at the runway intersection by applying an elevation correction, a temperature correction, and a gradient correction; determine, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signal the aircraft display device to display on a map depicting the takeoff runway an invalid intersection icon adjacent to each invalid runway intersection.

A method in a flight deck system in an aircraft for identifying valid runway intersections for takeoff is provided. The method includes: estimating a runway length required for takeoff based on aircraft parameters (e.g., aircraft type, aircraft weight, etc.); estimating, at each of a plurality of runway intersections, a corrected runway length at the runway intersection by applying an elevation correction, a temperature correction, and a gradient correction; determining, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

A non-transitory computer readable medium encoded with instructions configurable to cause a controller in an aircraft to perform a method for identifying valid runway intersections is provided. The method includes: estimating a runway length required for takeoff based on aircraft parameters (e.g., aircraft type, aircraft weight, etc.); estimating, at each of a plurality of runway intersections, a corrected runway length at the runway intersection by applying an elevation correction, a temperature correction, and a gradient correction; determining, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1A:
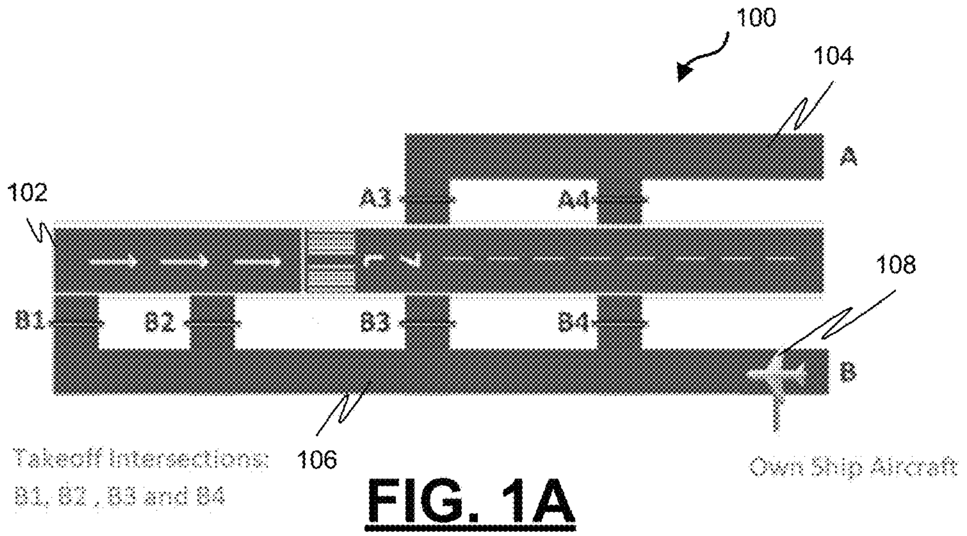
FIGS. 1A, 1B, and 1C are maps depicting an example operating environment at an airport or other aerodrome, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for estimating and providing an indication of valid intersections for a selected takeoff runway. The apparatus, systems, techniques, and articles provided considers aircraft parameters (e.g., aircraft type, weight, etc.) and current environmental conditions (e.g., airport elevation, temperature, runway gradient, etc.) and makes an estimation based on the considered aircraft parameters and environment conditions. The apparatus, systems, techniques, and articles provided herein can estimate corrections to basic runway length when estimating whether an intersection can be used as a takeoff intersection. The apparatus, systems, techniques, and articles provided herein can estimate corrections to be applied to basic runway length to determine the actual length of a runway at an aerodrome. The apparatus, systems, techniques, and articles provided herein can estimate corrections including an elevation correction, a temperature correction, and a gradient correction. The apparatus, systems, techniques, and articles provided herein can consider the runway corrections and aircraft parameters as a proposed taxi path to the takeoff runway is entered, and estimate and cause display valid intersections to be displayed.

An aircraft can be equipped with a three dimensional (3D) airport moving map (AMM) display function and/or a two dimensional (2D) AMM that can display an intended path for the aircraft to follow for taxiing from a parking area out to the departure runway in preparation for takeoff. The apparatus, systems, techniques, and articles provided herein can cause a display on the 3D AMM and/or 2D AMM (or other display) that indicates which runway intersection are suitable and cause the display of available runway length on both sides of the runway at the intersection. The apparatus, systems, techniques, and articles provided herein can cause an alert to be provided to flight crew when the takeoff runway is not being displayed to alert the flight crew when an unsuitable runway intersection has been selected.

The apparatus, systems, techniques, and articles provided herein can provide an alert based on a taxi plan input from ATC/Datalink/Manual fight crew entry. The apparatus, systems, techniques, and articles provided herein can compare aircraft parameters with the performance to identify pilot errors to input values (e.g., takeoff weight information, etc.). As an example, when a Pilot provides manual inputs to the system for performance calculation, the apparatus, systems, techniques, and articles provided herein can review the manual inputs to determine if they are correct based on aircraft specific parameters, parameters related to environment and required performance for intersections available.

FIG. 1A is a map depicting an example operating environment 100 at an airport or other aerodrome. The example operating environment 100 includes a takeoff runway 102, a taxiway A (104) and a taxiway B (106) on which an aircraft 108 traverses to reach the takeoff runway 102, and a plurality of runway intersections (A3, A4, B1, B2, B3, and B4) for accessing the takeoff runway 102 from the taxiway A (104) and the taxiway B (106). The runway intersections B1, B2, B3, and B4 are potential takeoff intersections for the aircraft 108.

Figure 1B:
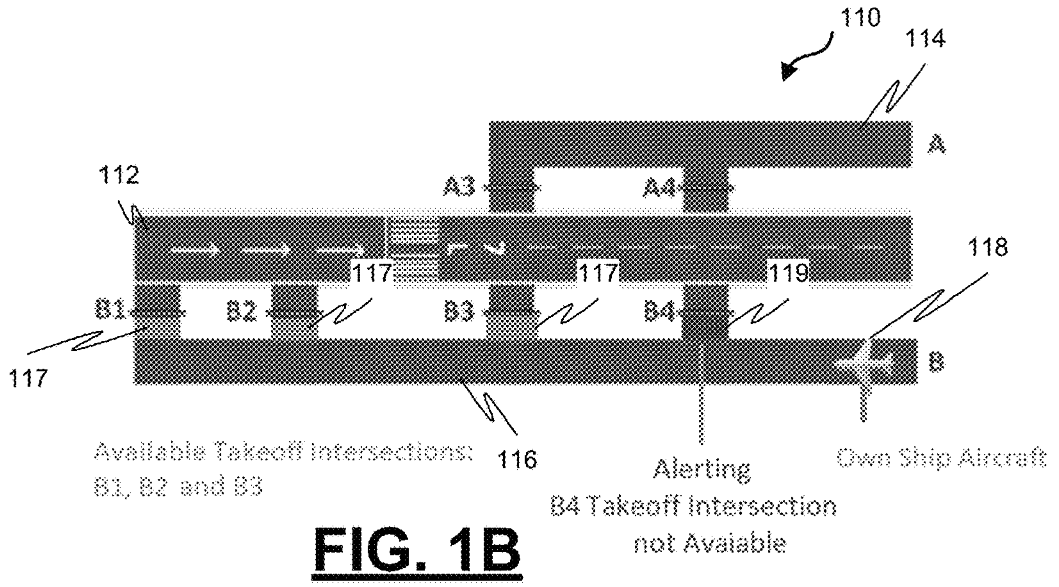

FIG. 1B is a map depicting an example operating environment 110 at an airport or other aerodrome. The example operating environment 110 includes a takeoff runway 112, a taxiway A (114) and a taxiway B (116) on which an aircraft 118 traverses to reach the takeoff runway 112, and a plurality of runway intersections (A3, A4, B1, B2, B3, and B4) for accessing the takeoff runway 112 from the taxiway A (114) and the taxiway B (116). The runway intersections B1, B2, B3, and B4 are potential takeoff intersections for the aircraft 108. In this example, runway intersections B1, B2, and B3 are each available as a takeoff intersection for the aircraft 118 and are so indicated by a valid intersection graphical element 117, and runway intersection B4 is not available as a takeoff intersection for the aircraft 118 and is so indicated by an invalid intersection graphical element 119. The valid intersection graphical element 117 may use various visual features such as color (e.g., green) to indicate that an associated runway intersection is available as a takeoff intersection. Similarly, the invalid intersection graphical element 119 may use various visual features such as color (e.g., red) to indicate that an associated runway intersection is not available as a takeoff intersection.

Figure 1C:
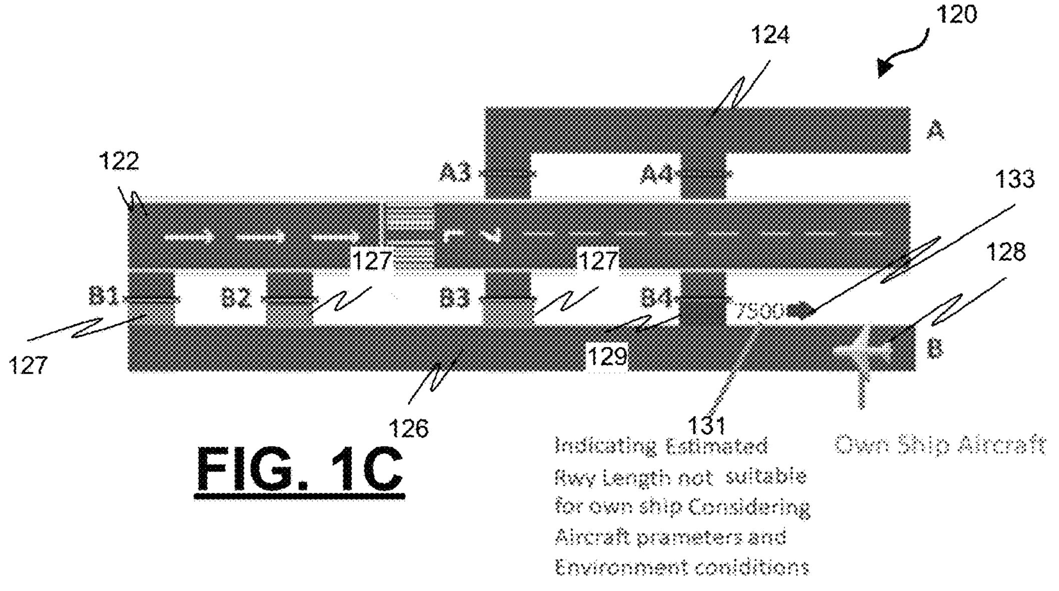

FIG. 1C is a map depicting an example operating environment 120 at an airport or other aerodrome. The example operating environment 120 includes a takeoff runway 122, a taxiway A (124) and a taxiway B (126) on which an aircraft 128 traverses to reach the takeoff runway 122, and a plurality of runway intersections (A3, A4, B1, B2, B3, and B4) for accessing the takeoff runway 122 from the taxiway A (124) and the taxiway B (126). The runway intersections B1, B2, B3, and B4 are potential takeoff intersections for the aircraft 108.

In this example, runway intersections B1, B2, and B3 are each available as a takeoff intersection for the aircraft 128 and are so indicated by a valid intersection graphical element 127, and runway intersection B4 is not available as a takeoff intersection for the aircraft 128 and is so indicated by an invalid intersection graphical element 129. The runway intersections B1, B2, and B3 are available as takeoff intersections for the aircraft 128 because they each have a corrected runway length that is long enough for use by the aircraft 128 for takeoff, wherein the corrected runway length is equal to a nominal runway length plus an elevation correction, a temperature correction, and a gradient correction, and wherein the nominal runway length is determined based on the actual length of the runway from the runway intersection to the end of the runway. The runway intersection B4 is not available as a takeoff intersection for the aircraft 128 because it has a corrected runway length that is not long enough for use by the aircraft 128 for takeoff. The valid intersection graphical element 127 may use various visual features such as color (e.g., green) to indicate that an associated runway intersection is available as a takeoff intersection. Similarly, the invalid intersection graphical element 129 may use various visual features such as color (e.g., red) to indicate that an associated runway intersection is not available as a takeoff intersection.

In this example, a corrected runway length graphical indicator 131 of a corrected runway length is provided adjacent to the runway intersection B4. This corrected runway length graphical indicator 131 provides a corrected runway length. The example corrected runway length graphical indicator 131 indicates that the corrected runway length at runway intersection is 7500 meters. Although, in this example, the corrected runway length graphical indicator 131 is only provided at the runway intersection B4, which is not available as a takeoff intersection, in other examples, the corrected runway length graphical indicator 131 may be provided at all or some of the other runway intersections (A1, A2, B1, B2, B3) including those runway intersections that are available as a takeoff intersection.

Also, in this example, a takeoff direction indicator 133 is provided adjacent to the runway intersection B4. This takeoff direction indicator 133 provides an indication of the direction to the end of the runway. Although, in this example, the takeoff direction indicator 133 is only provided at the runway intersection B4, which is not available as a takeoff intersection, in other examples, the takeoff direction indicator 133 may be provided at all or some of the other runway intersections (A1, A2, B1, B2, B3) including those runway intersections that are available as a takeoff intersection.

Figure 2:
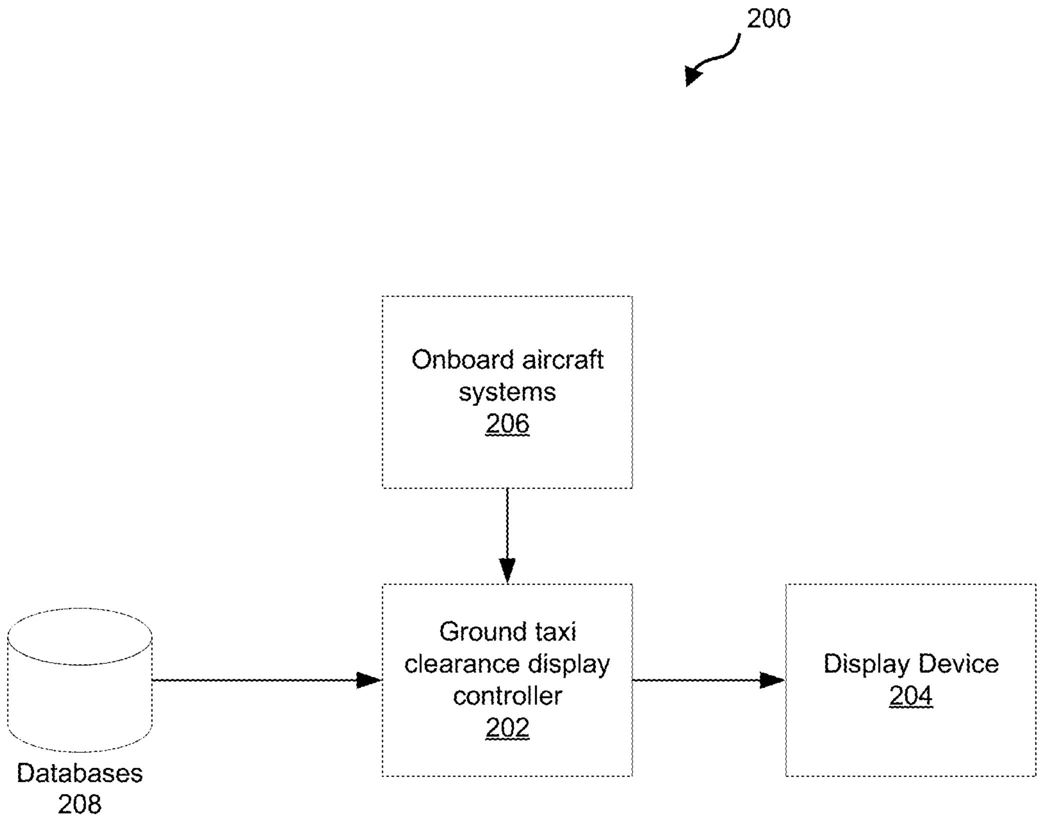
FIG. 2 is a block diagram depicting an example valid takeoff runway intersection identification system, in accordance with some embodiments.

FIG. 2 is a block diagram depicting an example valid takeoff runway intersection identification system 200. The example valid runway intersection identification system 200 includes a valid takeoff runway intersection controller 202 that is configured to identify valid takeoff runway intersections and invalid takeoff runway intersections to a flight crew via a display device 204. The example valid takeoff runway intersection controller 202 is configured to receive aircraft parameters (such as aircraft type and aircraft weight) and runway parameter information (such as actual runway length at various runway intersections, runway temperature, runway elevation, runway gradient) via onboard aircraft systems 206 and databases 208. The example valid takeoff runway intersection controller 202 is configured to use the aircraft parameters and runway parameter information to estimate a runway length required for takeoff based on the aircraft parameters, estimate a corrected runway length at each of a plurality of runway intersections by applying an elevation correction, a temperature correction, and a gradient (e.g., runway slope) correction to a nominal runway length for the runway intersection, and determine, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff. The example valid takeoff runway intersection controller 202 is further configured to signal the display device 204 to display on a map depicting the takeoff runway at least an invalid intersection icon adjacent to each invalid runway intersection. The display device 204 may be a primary flight display (PFD), Navigation display (ND), heads up display (HUD), heads down display (HDD), an electronic flight bag (EFB), a tablet computer, a smartphone, a wearable device, or some other device for displaying messages in an aircraft cockpit.

The valid takeoff runway intersection controller 202 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

To estimate a corrected runway length at a runway intersection, the takeoff runway intersection controller 202 is configured to estimate the elevation correction by multiplying a nominal runway length by a first factor, wherein the nominal runway length is determined based on the length of the runway from the runway intersection to the end of the runway. The takeoff runway intersection controller 202 is further configured to estimate the temperature correction by multiplying the nominal runway length by a second factor and estimate the gradient correction by multiplying the nominal runway length by a third factor. The takeoff runway intersection controller 202 estimates the corrected runway length as equating the corrected runway length to the nominal runway length plus the elevation correction, the temperature correction, and the gradient correction.

In one example, the first factor is based on a first fixed percentage increase per each fixed altitude range increase above sea level at the takeoff runway, the second factor is based on a second fixed percentage increase per fixed amount of temperature increase at the takeoff runway, and the third factor is based on a third fixed percentage increase per fixed degree of effective gradient when the combined elevation correction and temperature correction remains less than a fourth fixed percentage of the nominal runway length. In another example, the first factor is seven percent (7%) per 300 meter altitude above mean sea level (MSL), the second factor is one percent (1%) for every one-degree Celsius rise in Airport Reference Temperature (ART), and the third factor is 20 percent (20%) for every one percent of the effective gradient when the combined elevation correction and temperature correction remains less than 35 percent (35%) of the nominal takeoff runway length.

The example takeoff runway intersection controller 202 is configured to generate a takeoff runway map (e.g., operating environment 100/110/120) that graphically depicts the takeoff runway (e.g., takeoff runway 102/112/122), a taxiway (e.g., taxiway 106/116/126) on which the aircraft (e.g., aircraft 108/118/128) traverses to reach the takeoff runway, the runway intersections (e.g., B1 (107/117/127), B2 (107/117/127), B3 (107/117/127), and B4 (109/119/129)) from the taxiway to the takeoff runway, an aircraft graphical element 108/118/128 representative of the aircraft, a valid intersection graphical element (e.g., 117/127) for identifying each valid runway intersection and an invalid intersection graphical element (e.g., 119/129) for identifying each invalid runway intersection. The example takeoff runway intersection controller 202 is configured to further configured to signal an aircraft display device (e.g., display device 204) to display the takeoff runway map.

In one example, the takeoff runway intersection controller 202 is further configured to position an indication (e.g., corrected runway length graphical indicator 131) of the corrected runway length for each runway intersection adjacent to the runway intersection. In another example, the takeoff runway intersection controller 202 is further configured to position a takeoff direction indicator (e.g., takeoff direction indicator 133) for each runway intersection adjacent to the runway intersection. In another example, the takeoff runway intersection controller 202 is further configured to provide an alert on a cockpit display when the corrected runway length for a runway intersection selected using the cockpit display by a flight crew member is not long enough for use by the aircraft for takeoff.

Figure 3:
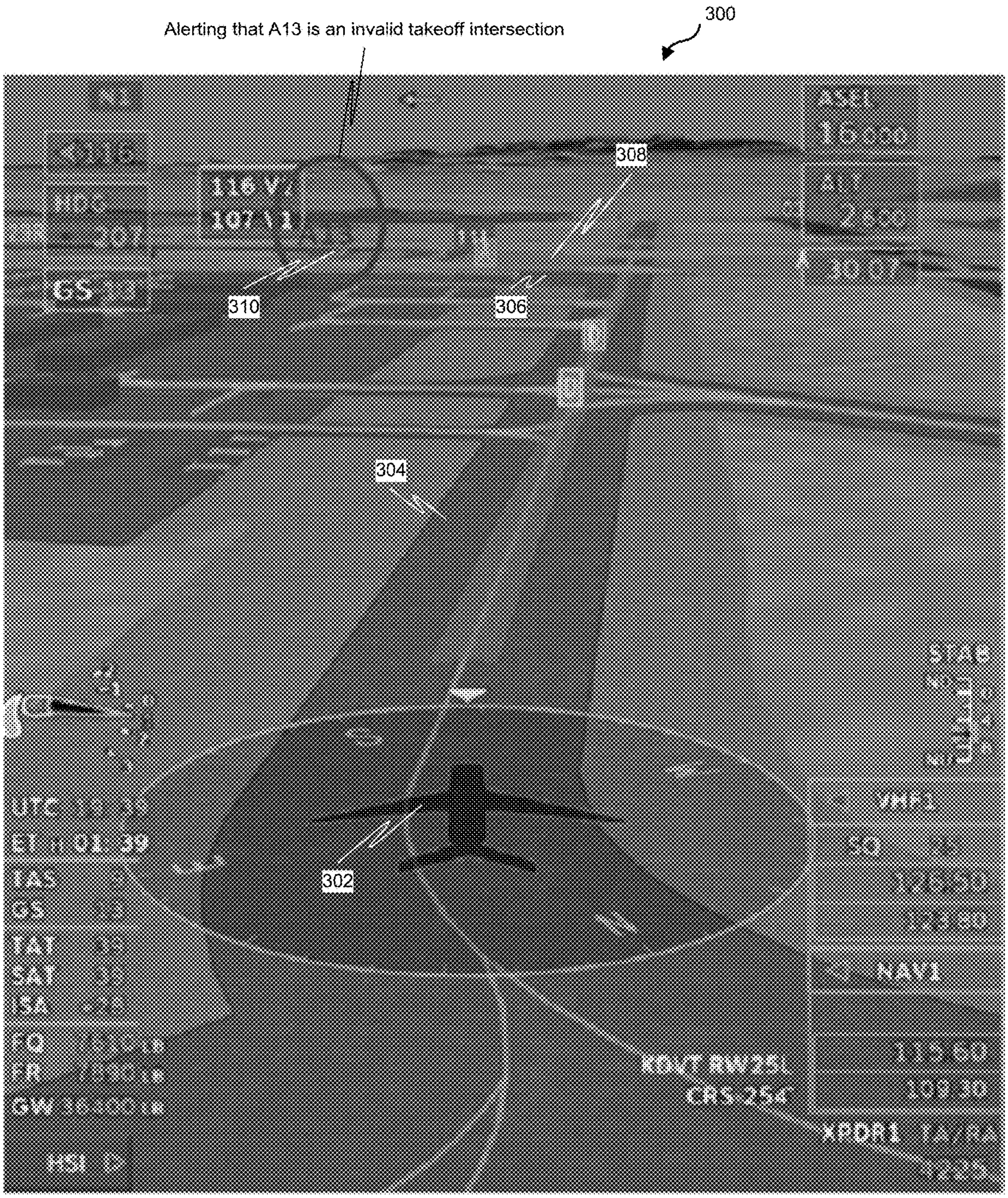
FIG. 3 is a diagram depicting an example 3D (three dimensional) AMM (airport moving map) display, in accordance with some embodiments.

FIG. 3 is a diagram depicting an example 3D (three dimensional) AMM (airport moving map) display 300. In the example 3D AMM display 300, illustrated are an icon 302 representative of an ownship aircraft, a first taxiway 304 on which the ownship is traversing, a second taxiway 306 on which the ownship is to traverse before turning onto a takeoff runway 308, an intersection 310 from the second taxiway 306 and the takeoff runway 308 that is identified by an intersection indicator A13 and that has been selected for use by the ownship for turning onto the runway 308. The intersection 310 may have been automatically selected by ATC, manually chosen by the flight crew, and/or received via a CPDLC message.

In this example, a takeoff runway intersection controller (e.g., controller 202) in the ownship has used ownship parameters and runway parameter information to estimate a runway length required for takeoff and has estimated a corrected runway length at the intersection 310 by applying an elevation correction, a temperature correction, and a gradient correction to a nominal runway length for the runway intersection 310, and determined, based on the estimated runway length required for takeoff and the corrected runway length at the runway intersection 310 is an invalid runway intersection because its corrected runway length is not long enough for use by the ownship for takeoff. The takeoff runway intersection controller has further provided an indication, through causing the intersection indicator A13 to be displayed in a visually distinguishable manner (e.g., bold type, highlighting, color such as red), that the runway intersection 310 identified as runway intersection A13 is not available as takeoff intersection.

Figure 4:
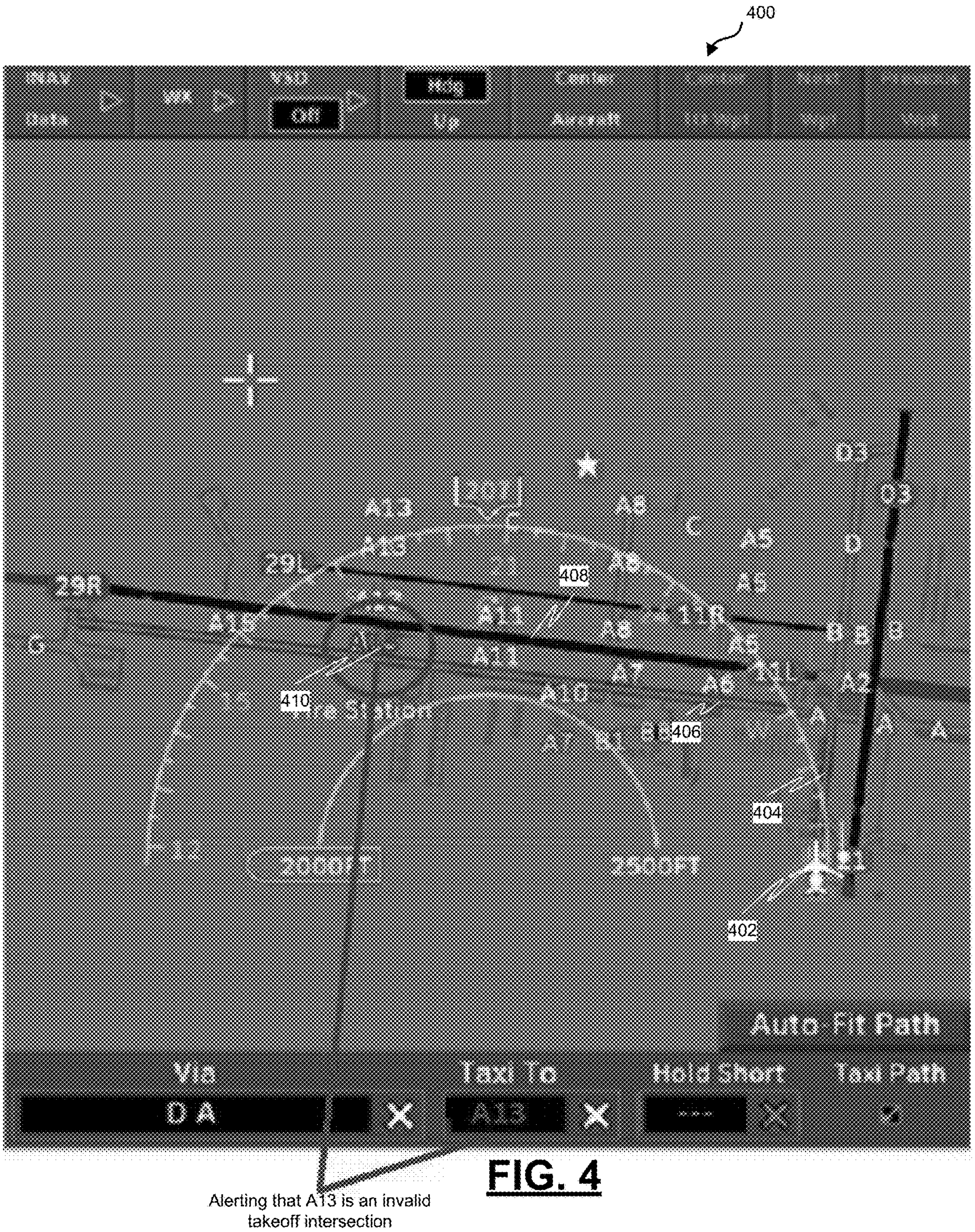
FIG. 4 is a diagram depicting an example 2D (two dimensional) AMM display, in accordance with some embodiments.

FIG. 4 is a diagram depicting an example 2D (two dimensional) AMM display 400. In the example 2D AMM display 400, illustrated are an icon 402 representative of an ownship aircraft, a first taxiway 404 on which the ownship is traversing, a second taxiway 406 on which the ownship is to traverse before turning onto a takeoff runway 408, an intersection 410 from the second taxiway 406 and the takeoff runway 408 that is identified by an intersection indicator A13 and that has been selected for use by the ownship for turning onto the runway 408. The intersection 410 may have been automatically selected by ATC, manually chosen by the flight crew, and/or received via a CPDLC message.

In this example, a takeoff runway intersection controller (e.g., controller 202) in the ownship has used ownship parameters and runway parameter information to estimate a runway length required for takeoff and has estimated a corrected runway length at the intersection 410 by applying an elevation correction, a temperature correction, and a gradient correction to a nominal runway length for the runway intersection 410, and determined, based on the estimated runway length required for takeoff and the corrected runway length at the runway intersection 410 is an invalid runway intersection because its corrected runway length is not long enough for use by the ownship for takeoff. The takeoff runway intersection controller has further provided an indication, through causing the intersection indicator A13 to be displayed in a visually distinguishable manner (e.g., bold type, highlighting, color such as red), that the runway intersection 410 identified as runway intersection A13 is not available as takeoff intersection.

Figure 5:
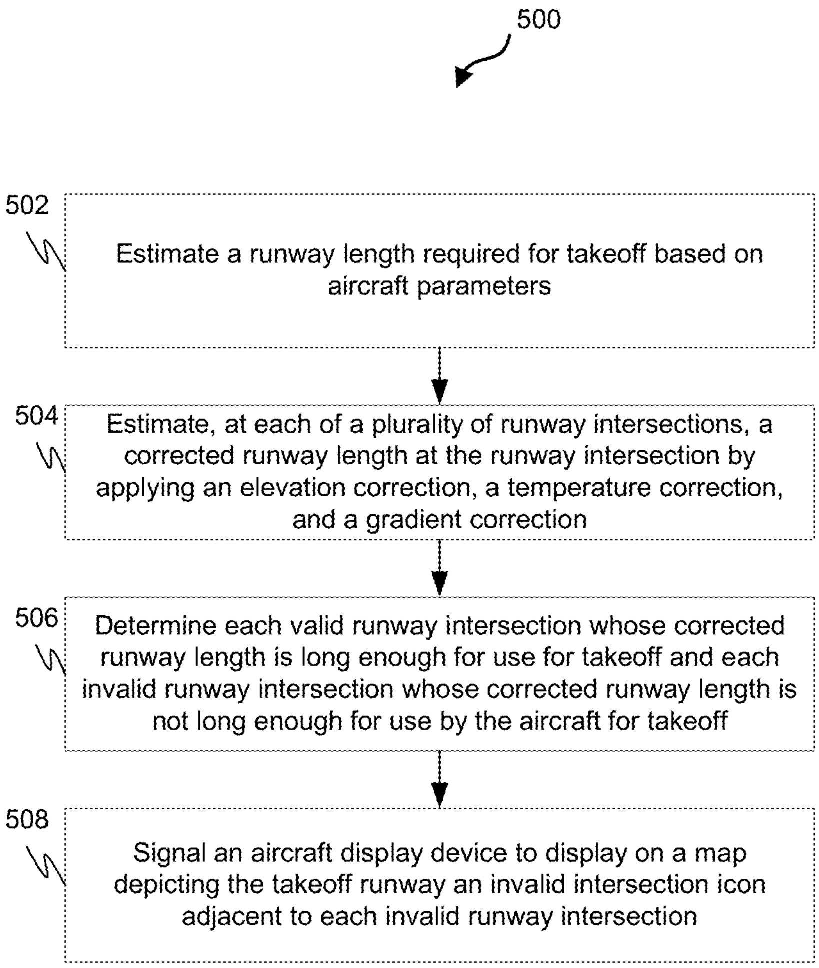
FIG. 5 is a process flow chart depicting an example process 500 in an aircraft for identifying valid runway intersections for takeoff, in accordance with some embodiments.

FIG. 5 is a process flow chart depicting an example process 500 in an example takeoff runway intersection controller (e.g., controller 202) in an aircraft for identifying valid runway intersections for takeoff. The order of operation within the process 500 is not limited to the sequential execution as illustrated in the figure, but may be performed in one or more varying orders as applicable and in accordance with the present disclosure.

The example process 500 includes estimating a runway length required for takeoff based on aircraft parameters (e.g., aircraft type, aircraft weight, etc.) (operation 502) and includes estimating, at each of a plurality of runway intersections, a corrected runway length at the runway intersection by applying an elevation correction, a temperature correction, and a gradient correction (operation 504). Estimating a corrected runway length may comprise: estimating the elevation correction by multiplying a nominal runway length by a first factor, wherein the nominal runway length is based on the length of the runway from the runway intersection to the end of the runway; estimating the temperature correction by multiplying the nominal runway length by a second factor; estimating the gradient correction by multiplying the nominal runway length by a third factor; and making the corrected runway length equal to the nominal runway length plus the elevation correction, the temperature correction, and the gradient correction.

In one example, the first factor is based on a first fixed percentage increase per each fixed altitude range increase above sea level at the takeoff runway, the second factor is based on a second fixed percentage increase per fixed amount of temperature increase at the takeoff runway, and the third factor is based on a third fixed percentage increase per fixed degree of effective gradient when the combined elevation correction and temperature correction remains less than a fourth fixed percentage of the nominal runway length.

In one example, the first factor is seven percent (7%) per 300 meter altitude above mean sea level (MSL), the second factor is one percent (1%) for every one-degree Celsius rise in Airport Reference Temperature (ART), and the third factor is 20 percent (20%) for every one percent of the effective gradient when the combined elevation correction and temperature correction remains less than 35 percent (35%) of the nominal takeoff runway length.

The example process 500 includes determining each valid runway intersection whose corrected runway length is long enough for use for takeoff and each invalid runway intersection whose corrected runway length is not long enough for use by the aircraft for takeoff (operation 506) and signaling an aircraft display device to display on a map depicting the takeoff runway an invalid intersection icon adjacent to each invalid runway intersection (operation 508).

The subject matter described herein discloses apparatus, systems, techniques, and articles for identifying valid runway intersections for takeoff. In one embodiment, a flight deck system for identifying valid runway intersections for takeoff is provided. The flight deck system comprises an aircraft display device in an aircraft and a controller. The controller is configured to: estimate a runway length required for takeoff based on aircraft parameters (e.g., aircraft type, aircraft weight, etc.); estimate, at each of a plurality of runway intersections, a corrected runway length at the runway intersection by applying an elevation correction, a temperature correction, and a gradient correction; determine, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signal the aircraft display device to display on a map depicting the takeoff runway an invalid intersection icon adjacent to each invalid runway intersection.

These aspects and other embodiments may include one or more of the following features. To estimate a corrected runway length the controller may be configured to estimate the elevation correction by multiplying a nominal runway length by a first factor, wherein the nominal runway length is based on the length of the runway from the runway intersection to the end of the runway; estimate the temperature correction by multiplying the nominal runway length by a second factor; and estimate the gradient correction by multiplying the nominal runway length by a third factor; wherein the corrected runway length is equal to the nominal runway length plus the elevation correction, the temperature correction, and the gradient correction. The first factor may be based on a first fixed percentage increase per each fixed altitude range increase above sea level at the takeoff runway, the second factor may be based on a second fixed percentage increase per fixed amount of temperature increase at the takeoff runway, and the third factor may be based on a third fixed percentage increase per fixed degree of effective gradient when the combined elevation correction and temperature correction remains less than a fourth fixed percentage of the nominal runway length. The first factor may be seven percent per 300 meter altitude above mean sea level (MSL), the second factor may be one percent for every one degree Celsius rise in Airport Reference Temperature (ART), and the third factor may be 20 percent for every one percent of the effective gradient when the combined elevation correction and temperature correction remains less than 35 percent of the nominal takeoff runway length. The controller may be further configured to: generate a takeoff runway map that graphically depicts the takeoff runway, a taxiway on which the aircraft traverses to reach the takeoff runway, the runway intersections from the taxiway to the takeoff runway, an aircraft graphical element representative of the aircraft, a valid intersection graphical element for identifying each valid runway intersection and an invalid intersection graphical element for identifying each invalid runway intersection; and signal the aircraft display device to display the takeoff runway map. The controller may be further configured position an indication of the corrected runway length for each runway intersection adjacent to the runway intersection. The controller may be further configured to position a takeoff direction indicator for each runway intersection adjacent to the runway intersection. The controller may be further configured to provide an alert on a cockpit display when the corrected runway length for a runway intersection selected using the cockpit display by a flight crew member is not long enough for use by the aircraft for takeoff.

In another embodiment, a method in a flight deck system in an aircraft for identifying valid runway intersections for takeoff is provided. The method comprises: estimating a runway length required for takeoff based on aircraft parameters (e.g., aircraft type, aircraft weight, etc.); estimating, at each of a plurality of runway intersections, a corrected runway length at the runway intersection by applying an elevation correction, a temperature correction, and a gradient correction; determining, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

These aspects and other embodiments may include one or more of the following features. Estimating a corrected runway length may comprise: estimating the elevation correction by multiplying a nominal runway length by a first factor, wherein the nominal runway length is based on the length of the runway from the runway intersection to the end of the runway; estimating the temperature correction by multiplying the nominal runway length by a second factor; estimating the gradient correction by multiplying the nominal runway length by a third factor; and making the corrected runway length equal to the nominal runway length plus the elevation correction, the temperature correction, and the gradient correction. The first factor may be based on a first fixed percentage increase per each fixed altitude range increase above sea level at the takeoff runway, the second factor may be based on a second fixed percentage increase per fixed amount of temperature increase at the takeoff runway, and the third factor may be based on a third fixed percentage increase per fixed degree of effective gradient when the combined elevation correction and temperature correction remains less than a fourth fixed percentage of the nominal runway length. The first factor may be seven percent per 300 meter altitude above mean sea level (MSL), the second factor may be one percent for every one degree Celsius rise in Airport Reference Temperature (ART), and the third factor may be 20 percent for every one percent of the effective gradient when the combined elevation correction and temperature correction remains less than 35 percent of the nominal takeoff runway length. The method may further comprise: generating a takeoff runway map that graphically depicts the takeoff runway, a taxiway on which the aircraft traverses to reach the takeoff runway, the runway intersections from the taxiway to the takeoff runway, an aircraft graphical element representative of the aircraft, a valid intersection graphical element for identifying each valid runway intersection and an invalid intersection graphical element for identifying each invalid runway intersection; and signaling the aircraft display device to display the takeoff runway map. The method may further comprise positioning an indication of the corrected runway length for each runway intersection adjacent to the runway intersection. The method may further comprise positioning a takeoff direction indicator for each runway intersection adjacent to the runway intersection. The method may further comprise providing an alert on a cockpit display when the corrected runway length for a runway intersection selected using the cockpit display by a flight crew member is not long enough for use by the aircraft for takeoff.

In another embodiment, a non-transitory computer readable medium encoded with instructions configurable to cause a controller in an aircraft to perform a method for identifying valid runway intersections for takeoff is provided. The method comprises: estimating a runway length required for takeoff based on aircraft parameters (e.g., aircraft type, aircraft weight, etc.); estimating, at each of a plurality of runway intersections, a corrected runway length at the runway intersection by applying an elevation correction, a temperature correction, and a gradient correction; determining, based on the estimated runway length required for takeoff and the corrected runway length at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

These aspects and other embodiments may include one or more of the following features. Estimating a corrected runway length may comprise: estimating the elevation correction by multiplying a nominal runway length by a first factor, wherein the nominal runway length is based on the length of the runway from the runway intersection to the end of the runway; estimating the temperature correction by multiplying the nominal runway length by a second factor; estimating the gradient correction by multiplying the nominal runway length by a third factor; and making the corrected runway length equal to the nominal runway length plus the elevation correction, the temperature correction, and the gradient correction. The first factor may be based on a first fixed percentage increase per each fixed altitude range increase above sea level at the takeoff runway, the second factor may be based on a second fixed percentage increase per fixed amount of temperature increase at the takeoff runway, and the third factor may be based on a third fixed percentage increase per fixed degree of effective gradient when the combined elevation correction and temperature correction remains less than a fourth fixed percentage of the nominal runway length. The first factor may be seven percent per 300 meter altitude above mean sea level (MSL), the second factor may be one percent for every one degree Celsius rise in Airport Reference Temperature (ART), and the third factor may be 20 percent for every one percent of the effective gradient when the combined elevation correction and temperature correction remains less than 35 percent of the nominal takeoff runway length. The method may further comprise: generating a takeoff runway map that graphically depicts the takeoff runway, a taxiway on which the aircraft traverses to reach the takeoff runway, the runway intersections from the taxiway to the takeoff runway, an aircraft graphical element representative of the aircraft, a valid intersection graphical element for identifying each valid runway intersection and an invalid intersection graphical element for identifying each invalid runway intersection; and signaling the aircraft display device to display the takeoff runway map. The method may further comprise positioning an indication of the corrected runway length for each runway intersection adjacent to the runway intersection. The method may further comprise positioning a takeoff direction indicator for each runway intersection adjacent to the runway intersection. The method may further comprise providing an alert on a cockpit display when the corrected runway length for a runway intersection selected using the cockpit display by a flight crew member is not long enough for use by the aircraft for takeoff.

In another embodiment, a flight deck system for identifying valid runway intersections for takeoff is provided. The flight deck system comprises a display device and a controller. The controller is configured to: estimate a runway length required for takeoff based on aircraft parameters (e.g., aircraft type, aircraft weight, etc.); and estimate, at each of a plurality of runway intersections, a corrected runway length at the runway intersection by applying an elevation correction, a temperature correction, and a gradient correction. To estimate a corrected runway length at the runway intersection the controller is configured to estimate the elevation correction by multiplying a nominal runway length by seven percent per 300 meter altitude above mean sea level (MSL), estimate the temperature correction by multiplying the nominal runway length by one percent for every one degree Celsius rise in Airport Reference Temperature (ART), and estimate the gradient correction by multiplying the nominal runway length by 20 percent for every one percent of the effective gradient when the combined elevation correction and temperature correction remains less than 35 percent of the nominal runway length, wherein the corrected runway length is equal to the nominal runway length plus the elevation correction, the temperature correction, and gradient correction. The controller is further configured to determine, based on the estimated runway length required for takeoff and the corrected runway length at each of the plurality of runway intersection, each valid runway intersection whose corrected runway length is long enough for use by the aircraft for takeoff and each invalid runway intersection whose corrected runway length is not long enough for use by the aircraft for takeoff; generate a runway display that shows the takeoff runway, the runway intersections, an icon representative of the aircraft, a first indicator that identifies any valid runway intersections and a second indicator that identifies any invalid runway intersections; position the available runway length and a takeoff direction indicator for a runway intersection on the runway display adjacent the runway intersection; signal a display device to display the runway display; and provide an alert when the corrected runway length for a selected runway intersection is not long enough for use by the aircraft for takeoff.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system for identifying valid runway intersections for takeoff, the flight deck system comprising:
- an aircraft display device in an aircraft; and
- a controller configured to:
  - estimate a runway length required for takeoff based on aircraft parameters;
  - estimate, at each of a plurality of runway intersections, a corrected runway length available for takeoff at the runway intersection by applying an elevation correction, a temperature correction, and a gradient correction to an actual length of the runway from the runway intersection to the end of the runway;

determine, based on the estimated runway length required for takeoff and the corrected runway length available for takeoff at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signal the aircraft display device to display on a map depicting the takeoff runway an invalid intersection icon adjacent to each invalid runway intersection.

2. The flight deck system of claim 1, wherein to estimate the controller is configured to:

estimate the elevation correction for determining the corrected runway length available for takeoff by multiplying the actual length of the runway from the runway intersection to the end of the runway by a first factor;

estimate the temperature correction for determining the corrected runway length available for takeoff by multiplying the actual length of the runway from the runway intersection to the end of the runway by a second factor; and estimate the gradient correction for determining the corrected runway length available for takeoff by multiplying the actual length of the runway from the runway intersection to the end of the runway by a third factor;

wherein the corrected runway length is equal to the actual length of the runway from the runway intersection to the end of the runway plus the elevation correction, the temperature correction, and the gradient correction.

3. The flight deck system of claim 2, wherein:

the first factor is based on a first fixed percentage per a fixed altitude level above sea level at the takeoff runway;

the second factor is based on a second fixed percentage per fixed amount of temperature increase at the takeoff runway; and the third factor is based on a third fixed percentage per fixed percentage of effective gradient when a combined elevation correction and temperature correction remains less than a fourth fixed percentage of the actual length of the runway from the runway intersection to the end of the runway.

4. The flight deck system of claim 3, wherein:

the first factor is seven percent per 300 meter altitude above mean sea level (MSL);

the second factor is one percent for every one-degree Celsius rise in Airport Reference Temperature (ART); and the third factor is 20 percent for every one percent of the effective gradient when the combined elevation correction and temperature correction remains less than 35 percent of the nominal takeoff runway length.

5. The flight deck system of claim 1, wherein the controller is further configured to:

generate a takeoff runway map that graphically depicts the takeoff runway, a taxiway on which the aircraft traverses to reach the takeoff runway, the runway intersections from the taxiway to the takeoff runway, an aircraft graphical element representative of the aircraft, a valid intersection graphical element for identifying each valid runway intersection and an invalid intersection graphical element for identifying each invalid runway intersection; and signal the aircraft display device to display the takeoff runway map.

6. The flight deck system of claim 5, wherein the controller is further configured position an indication of the corrected runway length for each runway intersection adjacent to the runway intersection.

7. The flight deck system of claim 6, wherein the controller is further configured to position a takeoff direction indicator for each runway intersection adjacent to the runway intersection.

8. The flight deck system of claim 1, wherein the controller is further configured to provide an alert on a cockpit display when the corrected runway length for a runway intersection selected using the cockpit display by a flight crew member is not long enough for use by the aircraft for takeoff.

9. A method in a flight deck system in an aircraft for identifying valid runway intersections for takeoff, the method comprising:

estimating a runway length required for takeoff based on aircraft parameters;

estimating, at each of a plurality of runway intersections, a corrected runway length available for takeoff at the runway intersection by applying an elevation correction, a temperature correction, and a gradient correction to an actual length of the runway from the runway intersection to the end of the runway;

determining, based on the estimated runway length required for takeoff and the corrected runway length available for takeoff at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

10. The method of claim 9, wherein estimating a corrected runway length comprises:

estimating the elevation correction for determining the corrected runway length available for takeoff by multiplying the actual length of the runway from the runway intersection to the end of the runway by a first factor;

estimating the temperature correction for determining the corrected runway length available for takeoff by multiplying the actual length of the runway from the runway intersection to the end of the runway by a second factor;

estimating the gradient correction for determining the corrected runway length available for takeoff by multiplying the actual length of the runway from the runway intersection to the end of the runway by a third factor; and making the corrected runway length equal to the actual length of the runway from the runway intersection to the end of the runway plus the elevation correction, the temperature correction, and the gradient correction.

11. The method of claim 10, wherein:

the first factor is based on a first fixed percentage per a fixed altitude level above sea level at the takeoff runway;

the second factor is based on a second fixed percentage per fixed amount of temperature increase at the takeoff runway; and the third factor is based on a third fixed percentage per fixed percentage of effective gradient when a combined elevation correction and temperature correction remains less than a fourth fixed percentage of the actual length of the runway from the runway intersection to the end of the runway.

12. The method of claim 11, wherein:

the first factor is seven percent per 300 meter altitude above mean sea level (MSL);

the second factor is one percent for every one-degree Celsius rise in Airport Reference Temperature (ART); and the third factor is 20 percent for every one percent of the effective gradient when the combined elevation correction and temperature correction remains less than 35 percent of the nominal takeoff runway length.

13. The method of claim 9, further comprising:

generating a takeoff runway map that graphically depicts the takeoff runway, a taxiway on which the aircraft traverses to reach the takeoff runway, the runway intersections from the taxiway to the takeoff runway, an aircraft graphical element representative of the aircraft, a valid intersection graphical element for identifying each valid runway intersection and an invalid intersection graphical element for identifying each invalid runway intersection; and signaling the aircraft display device to display the takeoff runway map.

14. The method of claim 13, further comprising positioning an indication of the corrected runway length for each runway intersection adjacent to the runway intersection.

15. The method of claim 14, further comprising positioning a takeoff direction indicator for each runway intersection adjacent to the runway intersection.

16. The method of claim 9, further comprising providing an alert on a cockpit display when the corrected runway length for a runway intersection selected using the cockpit display by a flight crew member is not long enough for use by the aircraft for takeoff.

17. A non-transitory computer readable medium encoded with instructions configurable to cause a controller in an aircraft to perform a method for identifying valid runway intersections for takeoff, the method comprising:

estimating a runway length required for takeoff based on aircraft parameters;

estimating, at each of a plurality of runway intersections, a corrected runway length available for takeoff at the runway intersection by applying an elevation correction, a temperature correction, and a gradient correction to an actual length of the runway from the runway intersection to the end of the runway;

determining, based on the estimated runway length required for takeoff and the corrected runway length available for takeoff at each of the plurality of runway intersections, each valid runway intersection from the plurality of runway intersections whose corrected runway length is long enough for use by the aircraft for takeoff and each invalid runway intersection from the plurality of runway intersections whose corrected runway length is not long enough for use by the aircraft for takeoff; and signaling an aircraft display device to display on a map depicting the takeoff runway an invalid intersection icon adjacent to each invalid runway intersection.

18. The non-transitory computer readable medium of claim 17, wherein estimating a corrected runway length comprises:

estimating the elevation correction for determining the corrected runway length available for takeoff by multiplying the actual length of the runway from the runway intersection to the end of the runway by a first factor;

estimating the temperature correction for determining the corrected runway length available for takeoff by multiplying the actual length of the runway from the runway intersection to the end of the runway by a second factor;

estimating the gradient correction for determining the corrected runway length available for takeoff by multiplying the actual length of the runway from the runway intersection to the end of the runway by a third factor; and making the corrected runway length equal to the actual length of the runway from the runway intersection to the end of the runway plus the elevation correction, the temperature correction, and the gradient correction.

19. The non-transitory computer readable medium of claim 18, wherein:

the first factor is based on a first fixed percentage per a fixed altitude level above sea level at the takeoff runway;

the second factor is based on a second fixed percentage per fixed amount of temperature increase at the takeoff runway; and the third factor is based on a third fixed percentage per fixed percentage of effective gradient when a combined elevation correction and temperature correction remains less than a fourth fixed percentage of the actual length of the runway from the runway intersection to the end of the runway.

20. The non-transitory computer readable medium of claim 19, wherein:

the first factor is seven percent per 300 meter altitude above mean sea level (MSL);

the second factor is one percent for every one-degree Celsius rise in Airport Reference Temperature (ART); and the third factor is 20 percent for every one percent of the effective gradient when the combined elevation correction and temperature correction remains less than 35 percent of the nominal takeoff runway length.

* * * * *